(12) United States Patent
Shearer et al.

(10) Patent No.: US 10,228,038 B2
(45) Date of Patent: Mar. 12, 2019

(54) DAMPER GUARD

(71) Applicant: Caterpillar Inc., Peoria, IL (US)

(72) Inventors: Nicholas Shearer, West Lafayette, IN (US); Mark A. Humrickhouse, Frankfort, IN (US)

(73) Assignee: Caterpillar Inc., Deerfield, IL (US)

( * ) Notice: Subject to any disclaimer, the term of this patent is extended or adjusted under 35 U.S.C. 154(b) by 113 days.

(21) Appl. No.: 15/596,314

(22) Filed: May 16, 2017

(65) Prior Publication Data
US 2018/0335101 A1 Nov. 22, 2018

(51) Int. Cl.
*F16F 9/38* (2006.01)
*F16F 15/10* (2006.01)
*F02F 7/00* (2006.01)

(52) U.S. Cl.
CPC .............. *F16F 9/38* (2013.01); *F02F 7/0021* (2013.01); *F02F 7/0043* (2013.01); *F16F 2230/06* (2013.01); *F16F 2230/10* (2013.01); *F16F 2230/30* (2013.01)

(58) Field of Classification Search
CPC ...... F16F 9/38; F16F 2230/06; F16F 2230/10; F16F 2230/30; F16F 15/10; F02F 7/0021; F02F 7/0043
See application file for complete search history.

(56) References Cited

U.S. PATENT DOCUMENTS

2005/0022774 A1   2/2005  Franke
2011/0048877 A1*  3/2011  Geislinger ............ F16F 15/173
                                                 188/277

FOREIGN PATENT DOCUMENTS

| CN | 201129397 | 10/2008 |
| CN | 201487129 | 5/2010 |
| CN | 203362998 | 12/2013 |
| CN | 103883673 | 6/2014 |
| DE | 102013113820 | 6/2015 |
| JP | 2000035086 | 2/2000 |

* cited by examiner

*Primary Examiner* — Jacob Amick

(57) ABSTRACT

A damper guard coupled to an external surface of an engine block includes a back cover defining an opening. The damper guard also includes a front cover adapted to couple to the back cover such that an enclosed space is defined between the front and back covers. The damper guard further includes a pressure balancing line coupled at a first portion of the back cover. The pressure balancing line is adapted to vent the enclosed space to an engine crankcase for maintaining the enclosed space at an engine crankcase pressure. The damper guard includes a drain line adapted to allow drainage of a damper oil present in the enclosed space.

20 Claims, 3 Drawing Sheets

DAMPER GUARD

TECHNICAL FIELD

The present disclosure relates to a damper guard for an engine damper.

BACKGROUND

Internal Combustion (IC) engines include a crankshaft for converting reciprocating motion of engine pistons into rotational motion. The crankshaft is positioned within a crankcase of the engine. The crankshaft is typically subjected to vibrations during engine operation. To help reduce vibrations along a length of the crankshaft, a damper is coupled to one end of the crankshaft. The damper may be positioned within the engine block or it may be coupled to an external surface of the engine block, based on system requirements. Dampers that are positioned within the engine block do not require sealing thereof. However, dampers coupled to the external surface of the engine block need to be sealed and positioned within a housing or a damper guard. Thus, the damper is generally positioned within the damper guard that protects the damper and also allows mounting of the damper to the engine block.

U.S. Published Application Number 2011/048877 describes a torsional vibration damper comprising a housing with a fluid-tight ring-shaped chamber and a vibration ring, which is rotatably supported in the ring-shaped chamber of the housing. Between the vibration ring and the housing, a gap-shaped oil receiving space is formed, which is filled with a viscous damping fluid. The oil receiving space has an oil outflow and an oil inflow. The oil drain communicates with a section of the oil receiving space located radially further outside than the oil inflow. The replacement of the damping fluid present in the oil receiving space is thus controlled. This makes it possible to refresh the damping fluid over an operation interval, so that the defined damping properties are maintained during the entire operation period.

SUMMARY OF THE DISCLOSURE

In one aspect of the present disclosure, a damper guard coupled to an external surface of an engine block is provided. The damper guard includes a back cover defining an opening. The damper guard also includes a front cover adapted to couple to the back cover such that an enclosed space is defined between the front and back covers. The damper guard further includes a pressure balancing line coupled at a first portion of the back cover. The pressure balancing line is adapted to vent the enclosed space to an engine crankcase for maintaining the enclosed space at an engine crankcase pressure. The damper guard includes a drain line adapted to allow drainage of a damper oil present in the enclosed space.

In another aspect of the present disclosure, an engine is provided. The engine includes a crankcase. The engine also includes a crankshaft mounted within the crankcase. The engine further includes an engine block. The engine includes a damper assembly coupled to an external surface of the engine block. The damper assembly includes a damper guard. The damper guard includes a back cover defining an opening. The damper guard also includes a front cover adapted to be coupled to the back cover such that an enclosed space is defined between the front and back covers. The damper guard further includes a pressure balancing line coupled at a first portion of the back cover. The pressure balancing line is adapted to vent the enclosed space to the crankcase for maintaining the enclosed space at a crankcase pressure. The damper guard includes a drain line adapted to allow drainage of a damper oil present in the enclosed space. The damper assembly also includes a damper positioned within the enclosed space.

In yet another aspect of the present disclosure, a damper assembly adapted to be coupled to an external surface of an engine block is provided. The damper assembly includes a damper guard. The damper guard includes a back cover defining an opening. The damper guard also includes a front cover adapted to be coupled to the back cover such that an enclosed space is defined between the front and back covers. Each of the front and back covers include a plurality of apertures defined therethrough. The plurality of apertures are aligned to receive mechanical fasteners therethrough for coupling the front and back covers with each other. The damper guard further includes a pressure balancing line coupled at a first portion of the back cover. The pressure balancing line is adapted to vent the enclosed space to an engine crankcase for maintaining the enclosed space at an engine crankcase pressure. The damper guard includes a drain line coupled at a second portion of the back cover. The drain line is adapted to allow drainage of a damper oil present in the enclosed space. Further, the drain line is adapted to fluidly couple the enclosed space with an engine oil pan. The damper assembly also includes a damper positioned within the enclosed space.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
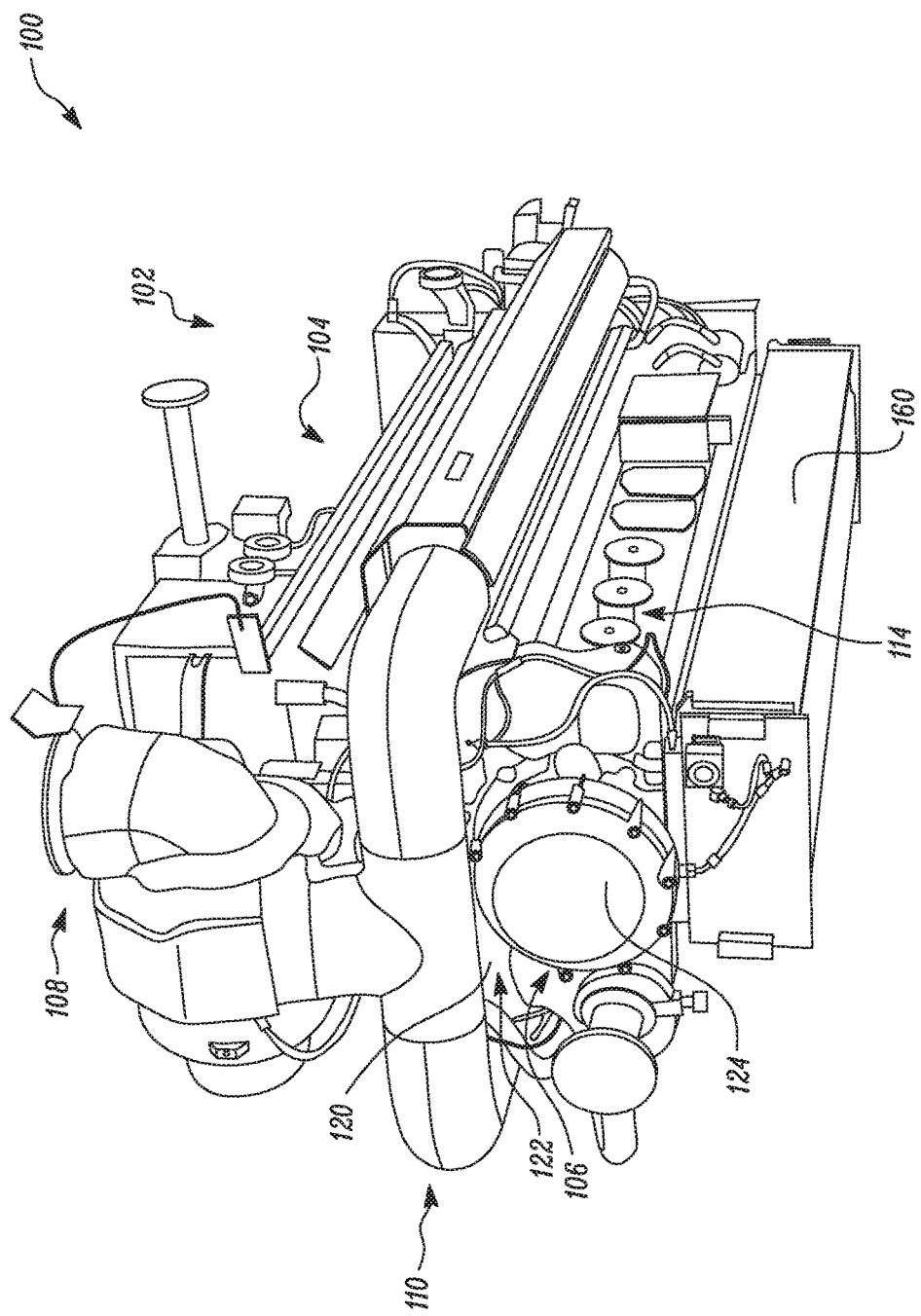
FIG. 1 is a perspective view of an exemplary engine, according to one embodiment of the present disclosure.

FIG. 1 illustrates a perspective view of an engine system 100. The engine system 100 includes an engine 102. The engine 102 is embodied as an internal combustion engine, and more particularly a reciprocating piston engine. Further, the engine 102 may include any one of a spark ignition engine or a compression ignition engine, such as a diesel engine, a natural gas engine, a homogeneous charge compression ignition engine, a reactivity controlled compression ignition engine, or any other engine known in the art. The engine 102 may be fueled by one or a combination of gasoline, diesel fuel, biodiesel, dimethyl ether, alcohol, natural gas, propane, or any other combustion fuel known in the art.

It should be recognized that the concepts of the present disclosure may be suitably applicable to any type and configuration of the engine system 100. The engine system 100 may be used to power a machine including, but not limited to, an on-highway truck, an off-highway truck, an earth moving machine, and an electric generator. Further, the engine system 100 may be associated with an industry including, but not limited to, transportation, construction, agriculture, forestry, power generation, marine, mining, and material handling.

The engine 102 includes an engine block 104. The engine block 104 includes a number of cylinders (not shown) defined therein. The cylinders may be arranged in any configuration such as inline, radial, "V", and so on. The engine 102 of the illustrated embodiment is a V-type engine. The engine 102 includes twenty cylinders. It should be noted that a number of cylinders associated with the engine 102 may vary based on the type of engine application. The engine 102 also includes a cylinder head (not shown) mounted on the engine block 104. The cylinder head may house one or more components and/or systems (not shown) of the engine 102 such as a valve train, an intake manifold, an exhaust manifold, sensors, and so on.

Further, a combustion chamber (not shown) is formed within each cylinder of the engine 102. The combustion chamber may receive intake air from the intake manifold (not shown). The engine 102 includes a turbocharger 10$ that increases an efficiency and power output of the engine 102 by forcing extra air into the combustion chamber of the engine 102. Further, products of combustion created during combustion within the combustion chamber are let out of the engine 102, via the exhaust manifold (not shown). The engine system 100 also includes an exhaust system 110. The exhaust system 110 treats exhaust gases exiting from the exhaust manifold of the engine 102. Additionally, the engine 102 may include various other components and/or systems (not shown) such as, a fuel system, an air system, a cooling system, an exhaust gas recirculation system, and so on.

The engine 102 further includes a piston (not shown) movably disposed within each of the cylinders. Each of the pistons may be coupled to a crankshaft 112 of the engine 102. Energy generated from combustion of fuel inside the cylinders may be converted to rotational energy of the crankshaft 112 by the pistons. The crankshaft 112 is mounted within a crankcase 114 (shown in FIG. 2) of the engine 102. Further, the engine 102 includes a flywheel (not shown) secured to one end of the crankshaft 112 and is contained in a flywheel housing.

The engine system 100 includes a damper assembly 106. The damper assembly 106 is coupled to an external surface 120 of the engine block 104, and more particularly to a housing 122 of the engine block 104. The damper assembly 106 includes a damper 116 (shown in FIG. 2) coupled to a free end of the crankshaft 112. More particularly, the damper 116 is coupled to a hub 118 (shown in FIG. 2) of the crankshaft 112. The damper 116 reduces or damps torsional vibrations generating along a length of the crankshaft 112. In the illustrated embodiment, the damper 116 is embodied as an externally sealed damper. The damper 116 may embody a liquid type damper, such as, an oil fed damper. Further, the damper 116 may embody a spring damper or a diaphragm damper, without any limitations.

Figure 2:
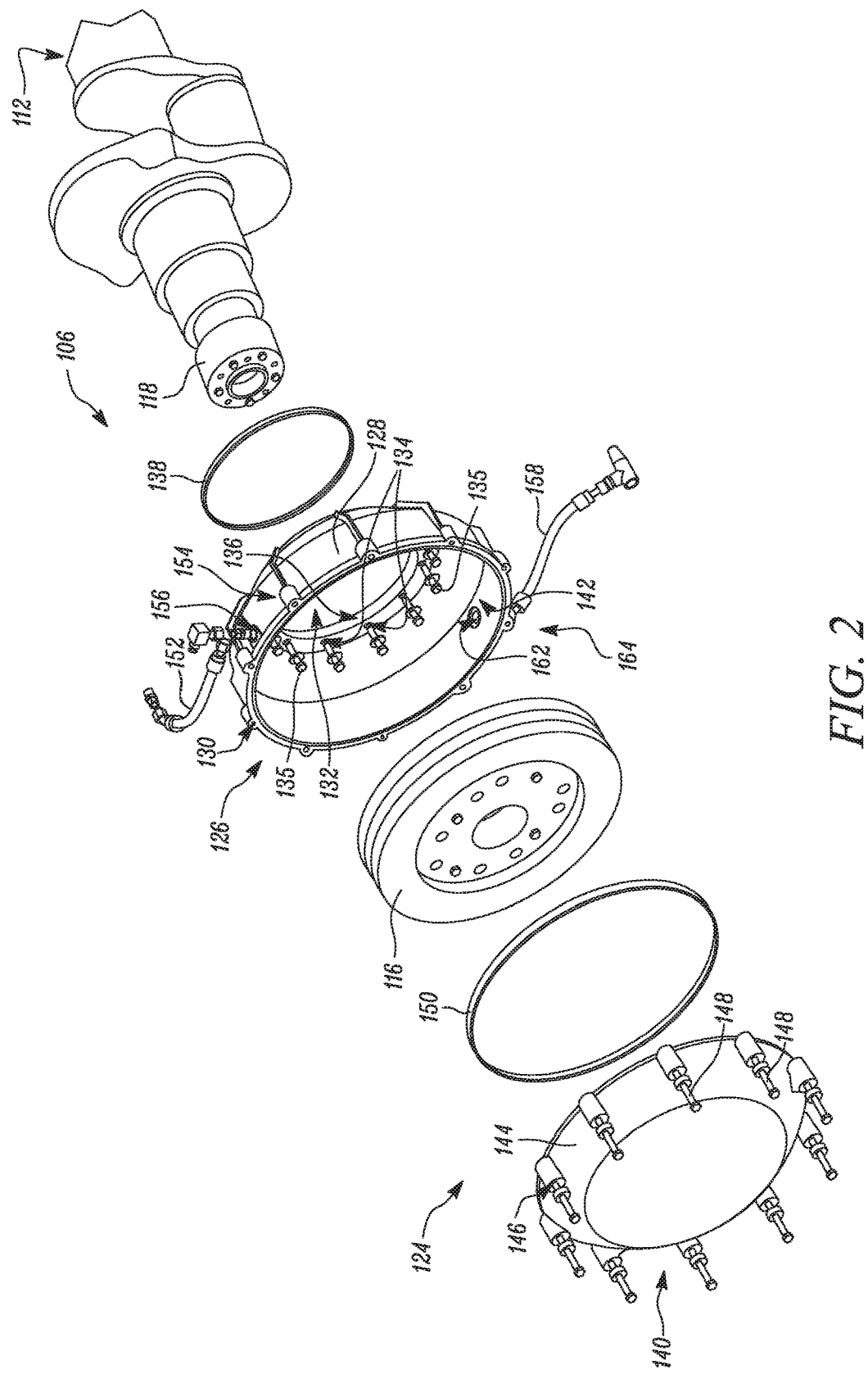
FIG. 2 is an exploded view of a damper guard for a damper associated with the engine of FIG. 1, according to an embodiment of the present disclosure.

The damper assembly 106 also includes a damper guard 124 that protects the damper 116 and mounts the damper 116 to the external surface 120 of the engine block 104. Referring to FIGS. 2, the damper guard 124 includes a two-piece design. The damper guard 124 includes a back cover 126. The back cover 126 is circular in shape, and includes a first peripheral surface 128. The first peripheral surface 128 defines a number of apertures 130. Each of the number of apertures 130 is embodied as a blind hole. Further, the back cover 126 includes a centrally disposed opening 132. The opening 132 is circular in shape. The opening 132 allows aligning of the damper 116 with the hub 118 of the crankshaft 112 for coupling the damper 116 with the hub 118.

The back cover 126 also includes a number of holes 134 provided circumferentially. The number of holes 134 is defined proximal to an inner surface 136 defined by the opening 132 in the back cover 126. The number of holes 134 is adapted to receive mechanical fasteners 135 therethrough for coupling the back cover 126 to the housing 122 of the engine block 104 (see FIG. 1). The mechanical fasteners 135 may include bolts, screws, pins, and the like, without any limitations. The damper guard 124 also includes a first sealing member 138. The first sealing member 138 is arranged concentrically with respect to the inner surface 136 of the back cover 126 for sealing the back cover 126 with the housing 122. In one example, the first sealing member 138 may embody an O-ring, without any limitations.

The damper guard 124 also includes a front cover 140. The front cover 140 has a circular shape, and a diameter of the front cover 140 is approximately equal to a diameter of the back cover 126. Further, a depth of the front cover 140 is lesser than a depth of the back cover 126. The front cover 140 couples with the back cover 126 such that an enclosed space 142 is defined between the front and back covers 140, 126. The damper 116 is positioned within the enclosed space 142 of the damper guard 124.

The front cover 140 includes a second peripheral surface 144. The second peripheral surface 144 defines a number of apertures 146. Each of the number of apertures 146 is embodied as a through hole. The number of apertures 146, 130 on the front and back covers 140, 126 are aligned with one another to receive mechanical fasteners 148 therethrough. The mechanical fasteners 148 removably couple the front cover 140 to the back cover 126. The mechanical fasteners 148 may include bolts, screws, pins, and the like, without any limitations. The damper guard 124 also includes a second sealing member 150. The second sealing member 150 is arranged between the front and back covers 140, 126 for sealing an interface between the front cover 140 with the back cover 126. In one example, the second sealing member 150 may embody an O-ring, without any limitations.

It should be noted that the back cover 126 is made of a first material and the front cover 140 is made of a second material. In one example, the first and second materials are different. In such an example, the back cover 126 is made of cast iron, whereas the front cover 140 is made of cast aluminum, without limiting the scope of the present disclosure. Alternatively, the first and second materials may be similar, without any limitations. In one example, the front and back covers 140, 126 may be embodied as cast components. Alternatively, any known additive or subtractive manufacturing process may be used to manufacture the front and back covers 140, 126.

Figure 3:
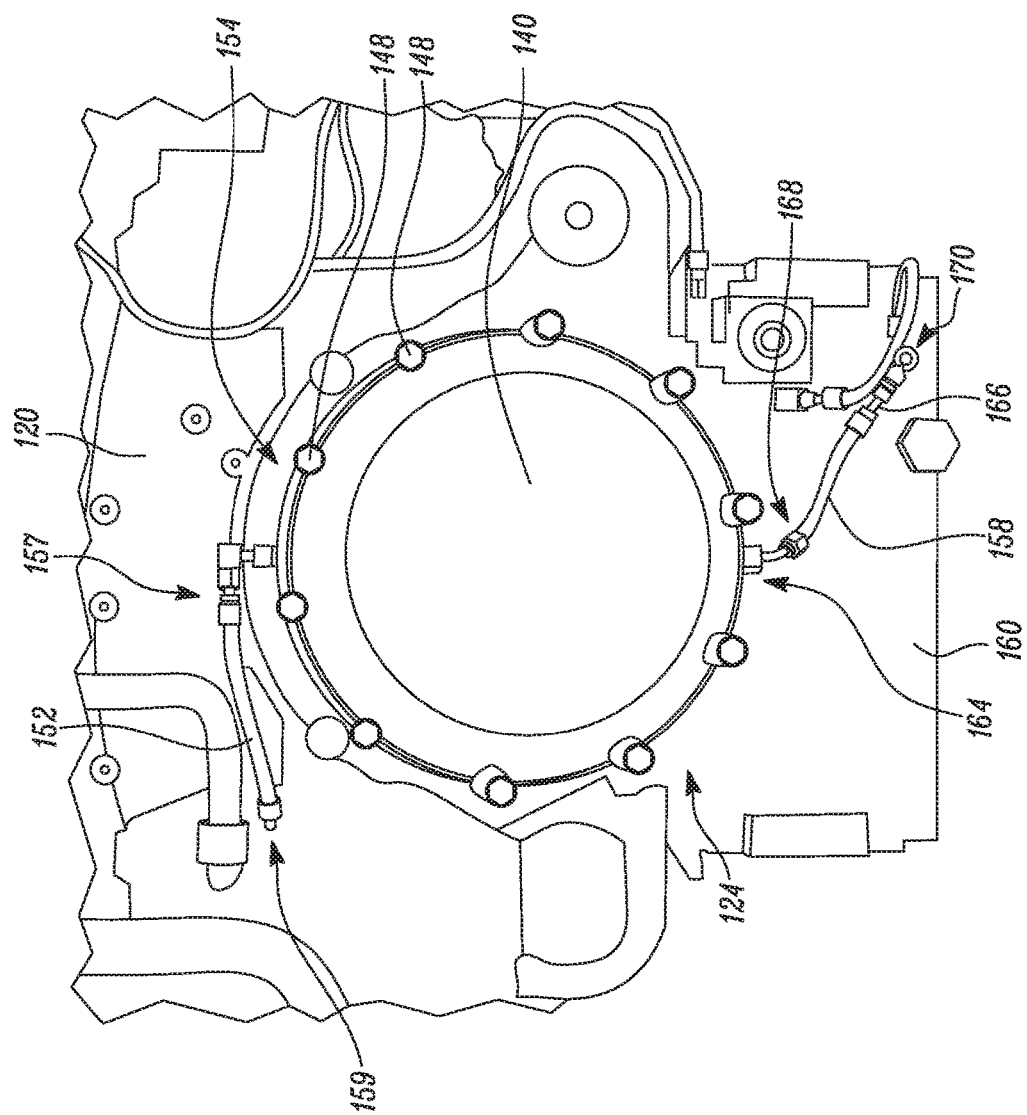
FIG. 3 is a side view of the engine of FIG. 1 showing the damper guard coupled to an engine block.

Referring now to FIG. 3, the damper guard 124 includes a pressure balancing line 152. The pressure balancing line 152 vents the enclosed space 142 to the crankcase 114 (see FIG. 1) for maintaining the enclosed space 142 (see FIG. 1) at a crankcase pressure. The pressure balancing line 152 is coupled at a first portion 154 of the first peripheral surface 128 of the back cover 126. When the front cover 140 is coupled with the back cover 126 (see FIG. 2), the pressure balancing line 152 fluidly couples the enclosed space 142 of the damper guard 124 with the crankcase 114 via a first aperture 156 (shown in FIG. 2) formed at the first portion 154 of the back cover 126. More particularly, a first end 157 of the pressure balancing line 152 is coupled to the first aperture 156 and is in fluid communication with the enclosed space 142 and a second end 159 of the pressure balancing line 152 is let towards the crankcase 114 in order to provide fluid communication of the pressure balancing line 152 with the crankcase 114. The pressure balancing line 152 includes a hose. In one example, the hose may include a rubber tube or any flexible tube, without any limitations.

Further, the damper guard 124 includes a drain line 158. When the damper 116 is embodied as an oil fed damper, the drain line 158 allows drainage of any damper oil that leaks from the damper 116 and is collected within the enclosed space 142. The pressure balancing line 152 maintains the enclosed space 142 at the crankcase pressure, which in turn helps in draining of the damper oil contained in the enclosed space 142 towards an oil pan 160, via the drain line 158. When the front cover 140 is coupled with the back cover 126, the drain line 158 fluidly couples the enclosed space 142 of the damper guard 124 with the oil pan 160 via a second aperture 162 (shown in FIG. 2). More particularly, a first end 168 of the drain line 158 is coupled to the second aperture 162 (see FIG. 1) and a second end 170 of the drain line 158 is in fluid communication with the oil pan 160.

Further, the second aperture 162 is formed at a second portion 164 of the first peripheral surface 128 of the back cover 126. It should be noted that the second portion 164 lies diametrically opposite to the first portion 154. Further, the drain line 158 includes a hose. In one example, the hose may include a rubber hose or any flexible tube, without any limitations. The drain line 158 further includes a check valve 166. The check valve 166 restricts a back flow of the damper oil towards the enclosed space 142 of the damper guard 124. The check valve 166 may embody any known valve that allows the damper oil to flow in one direction and restricts any back flow of the damper oil towards the enclosed space 142, without any limitations.

INDUSTRIAL APPLICABILITY

The present disclosure relates to the two-piece damper guard 124 for mounting the damper 116 to the external surface 120 of the engine block 104. The damper guard 124 is simple to design and manufacture, and is cost effective. Further, the damper guard 124 disclosed herein can be easily retrofitted to an existing engine. The damper guard 124 includes a leakage proof design that is capable of containing and draining the damper oil discharged from the damper 116 back to the oil pan 160, via the drain line 158. Further, the damper guard 124 includes the pressure balancing line 152 that maintains the pressure within the enclosed space 142 to the crankcase pressure and further helps in drainage of the damper oil from the damper guard 124.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A damper guard coupled to an external surface of an engine block, the damper guard comprising:
    a back cover defining an opening;
    a front cover adapted to couple to the back cover such that an enclosed space is defined between the front and back covers;
    a pressure balancing line coupled at a first portion of the back cover, the pressure balancing line adapted to vent the enclosed space to an engine crankcase for maintaining the enclosed space at an engine crankcase pressure; and
    a drain line adapted to allow drainage of a damper oil present in the enclosed space.

2. The damper guard of claim 1, wherein the back cover includes a plurality of holes provided circumferentially, the plurality of holes adapted to receive mechanical fasteners therethrough for coupling the back cover to a housing of the engine block.

3. The damper guard of claim 1, wherein each of the front and back covers has a circular shape.

4. The damper guard of claim 1, wherein each of the front and back covers includes a plurality of apertures that are aligned with one another, the plurality of apertures adapted to receive mechanical fasteners therethrough for removably coupling the front cover to the back cover.

5. The damper guard of claim 1, wherein the pressure balancing line is adapted to fluidly couple the enclosed space of the damper guard with the engine crankcase via a first aperture formed at the first portion of the back cover.

6. The damper guard of claim 1, wherein the drain line is adapted to fluidly couple the enclosed space of the damper guard with an oil pan via a second aperture formed at a second portion of the back cover, wherein the second portion lies diametrically opposite to the first portion.

7. The damper guard of claim 1, wherein the drain line further includes a check valve adapted to restrict a back flow of the damper oil towards the enclosed space of the damper guard.

8. The damper guard of claim 1, wherein the opening in the back cover allows aligning of a damper with a hub of an engine crankshaft for coupling the damper with the hub.

9. The damper guard of claim 1 further comprising a sealing member for sealing the damper guard.

10. The damper guard of claim 1, wherein the back cover is made of a first material and the front cover is made of a second material, the first material being different from the second material.

11. An engine comprising:
    a crankcase;
    a crankshaft mounted within the crankcase;
    an engine block; and
    a damper assembly coupled to an external surface of the engine block, the damper assembly comprising:
        a damper guard comprising:
            a back cover defining an opening;
            a front cover adapted to be coupled to the back cover such that an enclosed space is defined between the front and back covers;
            a pressure balancing line coupled at a first portion of the back cover, the pressure balancing line adapted to vent the enclosed space to the crankcase for maintaining the enclosed space at a crankcase pressure; and
            a drain line adapted to allow drainage of a damper oil present in the enclosed space; and
        a damper positioned within the enclosed space.

12. The engine of claim 11, wherein the back cover includes a plurality of holes provided circumferentially, the plurality of holes adapted to receive mechanical fasteners therethrough for coupling the back cover to a housing of the engine block.

13. The engine of claim 11, wherein each of the front and back covers has a circular shape.

14. The engine of claim 11, wherein each of the front and back covers includes a plurality of apertures that are aligned with one another, the plurality of apertures adapted to receive mechanical fasteners therethrough for removably coupling the front cover to the back cover.

15. The engine of claim 11, wherein the pressure balancing line is adapted to fluidly couple the enclosed space of the damper guard with the crankcase via a first aperture formed at the first portion of the back cover.

16. The engine of claim 11, wherein the drain line is adapted to fluidly couple the enclosed space of the damper guard with an oil pan via a second aperture formed at a second portion of the back cover, wherein the second portion lies diametrically opposite to the first portion.

17. The engine of claim 11, wherein the drain line further includes a check valve adapted to restrict a back flow of the damper oil towards the enclosed space of the damper guard.

18. The engine of claim 11, wherein the opening in the back cover allows aligning of the damper with a hub of the crankshaft for coupling the damper with the hub.

19. The engine of claim 11 further comprising a sealing member for sealing the damper guard.

20. A damper assembly adapted to be coupled to an external surface of an engine block, the damper assembly comprising:
    a damper guard comprising:
        a back cover defining an opening;
        a front cover adapted to be coupled to the back cover such that an enclosed space is defined between the front and back covers, each of the front and back covers including a plurality of apertures defined therethrough, the plurality of apertures being aligned to receive mechanical fasteners therethrough for coupling the front and back covers with each other;
    a pressure balancing line coupled at a first portion of the back cover, the pressure balancing line adapted to vent the enclosed space to an engine crankcase for maintaining the enclosed space at an engine crankcase pressure; and
    a drain line coupled at a second portion of the back cover, the drain line adapted to allow drainage of a damper oil present in the enclosed space, wherein the drain line is adapted to fluidly couple the enclosed space with an engine oil pan; and
    a damper positioned within the enclosed space.

\* \* \* \* \*